United States Patent [19]
Osborne

[11] Patent Number: 5,820,951
[45] Date of Patent: Oct. 13, 1998

[54] BEVERAGE CONTAINER WITH TEMPERATURE SENSITIVE MARKING

[75] Inventor: John P. Osborne, Kildeer, Ill.

[73] Assignee: Codell Industries, Inc., Las Vegas, Nev.

[21] Appl. No.: 698,724

[22] Filed: Aug. 16, 1996

[51] Int. Cl.⁶ .................................................. G09G 3/34
[52] U.S. Cl. ...................... 428/29; 428/35.7; 428/913; 252/408.1; 206/524.3; 215/365
[58] Field of Search ............................ 428/29, 913, 35.7; 252/408.1; 206/524.3; 215/12.2, 365

[56] References Cited

U.S. PATENT DOCUMENTS

| | | | |
|---|---|---|---|
| 4,028,118 | 6/1977 | Nakasuji et al. | 106/21 |
| 4,717,710 | 1/1988 | Shimizu et al. | 503/213 |
| 4,756,758 | 7/1988 | Lent et al. | 106/22 |
| 4,919,983 | 4/1990 | Fremin | 428/35.7 |
| 5,202,677 | 4/1993 | Parker et al. | 340/786 |

*Primary Examiner*—Charles Nold
*Attorney, Agent, or Firm*—Wood, Phillips, VanSanten, Clark & Mortimer

[57] ABSTRACT

A product container having a wall defining a receptacle for a product, and first structure on the wall changeable from a first state to a second state as an incident of the first structure being heated above a first predetermined temperature. The first structure is changeable from the second state to the first state as an incident of the first structure being cooled below a second predetermined temperature below the first predetermined temperature. The first structure remains in the first state with the first structure in a temperature range including temperatures above the second predetermined temperature.

10 Claims, 2 Drawing Sheets

BEVERAGE CONTAINER WITH TEMPERATURE SENSITIVE MARKING

BACKGROUND OF THE INVENTION

1. Field of the Invention

This invention relates to containers for beverages and, more particularly, to a container that changes state in response to the introduction of a beverage at or above/below a predetermined temperature.

2. Background Art

Sales of positioned quantities of beverages, such as beer and soda, may be highly profitable. This is particularly true with concessions at stadiums and ballparks where tens of millions of containers of these beverages may be sold for a particular sporting season. While beverage sales in this environment may be highly profitable, they are also very difficult to monitor. In the most basic beer and soda dispensing systems, there is no provision for flow control or monitoring. The individual dispensing the beverage can simply take an empty container and dispense the beverage by pulling down a lever or pressing a button, visually monitoring the pour to fill the particular container to the desired level. There is basically no way to keep tabs on the individuals dispensing the beverage, as a consequence of which these persons may offer free refills or refills for a small gratuity which does not find its way to the establishment.

The inventor herein has been involved in the development of dispensing units which are programmable to provide a metered pour, which are simply set to fill different size containers. In the latest version of this device, the pressure of liquid from a supply is monitored so that accurate pours are made, even in spite of pressure variations in the liquid supply. This latter device is the subject of pending U.S. application Ser. No. 08/681,326 U.S. Pat. No. 5,730,323 entitled "Automatic Pressure Regulated Liquid Dispensing Device.

While these systems have made possible monitoring of individual portions and gross volumes, the problem of free pouring still persists. In a typical situation, the customer will purchase a single container of beverage, exhaust the beverage, and offer the empty container to the individual dispensing the beverage to be refilled. The empty container, particularly in the chaotic environment often surrounding a concession, will be indistinguishable from an empty, unused container that is being properly filled. This refill may go undetected even by a manager supervising a concession area.

While the losses attributable to the above dishonest activity may appear trivial at any one station, when these losses are multiplied by the number of concession stands and the number of events/games in a particular season, the losses become very significant. For example, in an environment where tens of millions of beverage pours are made over the course of a season, the losses may be in the hundreds of thousands of dollars. To date, no technology is known to the inventor herein that is available to address this problem.

SUMMARY OF THE INVENTION

In one form of the invention, a product container is provided having a wall defining a receptacle for a product, and first structure on the wall changeable from a first state to a second state as an incident of the first structure being heated above a first predetermined temperature. The first structure is changeable from the second state to the first state as an incident of the first structure being cooled below a second predetermined temperature below the first predetermined temperature. The first structure remains in the first state with the first structure in a temperature range including temperatures above the second predetermined temperature.

In one form, the first structure in the first state has a first color and the first structure in the second state has a second color that is different than the first color.

In one form, the container wall has an exposed surface and the first structure is a coating applied to the container wall so that the first structure in the first state visibly contrasts with the exposed surface of the container wall.

The coating may be at least one of a) applied to the entire exposed surface of the container wall, b) applied to only a portion of the exposed surface of the container wall, and c) selectively applied to the exposed surface of the container wall to produce a predetermined contrasting shape with the coating in the first state. The contrasting shape may be a written message or design.

The coating may be a thermo chromic ink that may be applied as by using a silk screening process.

The inventive container may be provided in combination with a scanner having structure for sensing the presence of the first structure in the first state and for producing a first signal as an incident of the sensing structure sensing the presence of the first structure in the first state, with the sensing structure one of a) producing a second signal that is different than the first signal and b) producing no signal as an incident of the sensing structure sensing the presence of the first structure in the second state.

The inventive container may also be provided in combination with a dispensing system for a liquid including a dispensing valve having an open state in which liquid from a supply is allowed to flow through the dispensing valve to a point of use and a closed state, with there being structure on the dispensing system for receiving the first signal and as an incident thereof at least one of changing the dispensing valve from the open state into the closed state and b) preventing the dispensing valve from being changed from the closed state into the open state.

The inventive product container may also be provided in combination with a product in a receptacle, which product is at least one of a liquid, a solid, and an edible article.

In another form of the invention, a product container is provided having a wall defining a receptacle for a product, and first structure on the wall changeable from a first state to a second state as an incident of the first structure realizing a first predetermined temperature. The first structure is changeable from the second state to the first state as an incident of the first structure realizing a second predetermined temperature that is different than the first predetermined temperature. The first structure remains in the first state with the first structure in a temperature range including temperatures between the first and second predetermined temperatures.

DETAILED DESCRIPTION OF THE DRAWINGS

Figure 1:
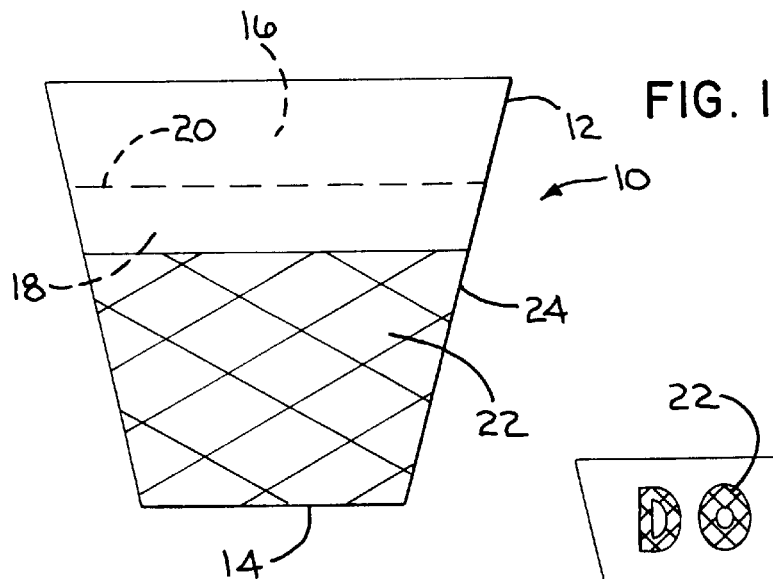
FIG. 1 is a side elevation view of a product container having the present invention incorporated therein.

One form of product container, according to the present invention, is shown at 10 in FIG. 1. The product container 10 has a continuous peripheral wall 12 and a bottom wall 14 cooperatively defining a receptacle 16 for in this case a supply of a beverage 18, shown filled up to a line 20.

According to the invention, a coating 22 is applied to the exposed surface 24 of at least the peripheral wall 12. The coating 22 is preferably a thermo chromic ink identified in its commercial form as COLORTELL HYSTERISIS TYPE 2.0AQC WATER BASE SILK SCREEN INK NO. 13–41.

This coating 22 has two different states which are visibly discernible. By heating the coating 22 above a first predetermined temperature, approximately 106° F., the coating 22 changes from a first state into a second state. In the first state, the coating has a first color and in the second state it has a second color that is different than the first color. When the coating is cooled below 56° F., it changes from the second state back to the first state. The first state will be maintained until the coating is reheated to 106° F.

Since beverages, such as beer, are commonly served between 36° and 43° F., introduction of beer at this temperature to the receptacle 16 will cause heat conduction to the coating 22, thereby changing the coating 22 from the second state back into the first state. This state will be maintained until the coating 22 is reheated to 106° F. which will normally not occur in the consuming environment without applying heat from an external source.

Accordingly, a purveyor of beverages can monitor the container 10 to determine whether the container 10 is being filled for the first time or being refilled by visually observing the state of the coating 22. By prominently applying the coating to a significant area of the exposed surface 24 as in FIG. 1, the state of the coating 22 can be determined from a distance. While the coating 22 is shown on only a portion of the exposed surface 24, the coating 22 could cover the entire exposed surface 24.

Figure 2:
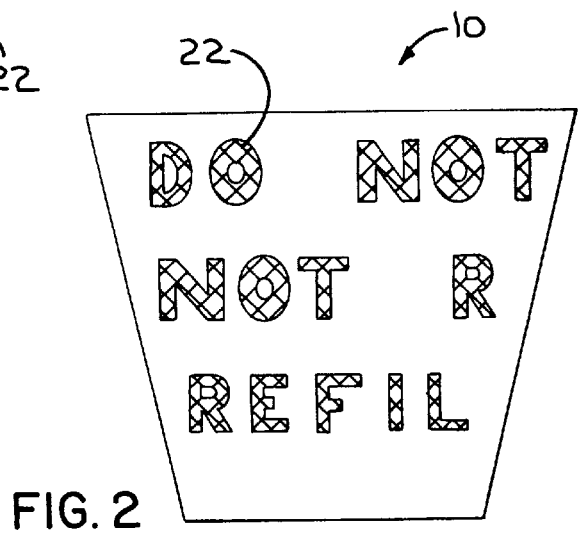
FIG. 2 is a side elevation view of a product container as in FIG. 1 with a modified form of the present invention.

In another form of the invention, as shown in FIG. 2, the container 10 has the coating 22 selectively applied thereto in a predetermined form, in this case as a written message and design that warns the person dispensing the beverages not to refill the container 10. In this case, an exemplary message is shown with a specific warning "DO NOT REFILL".

Figure 3:
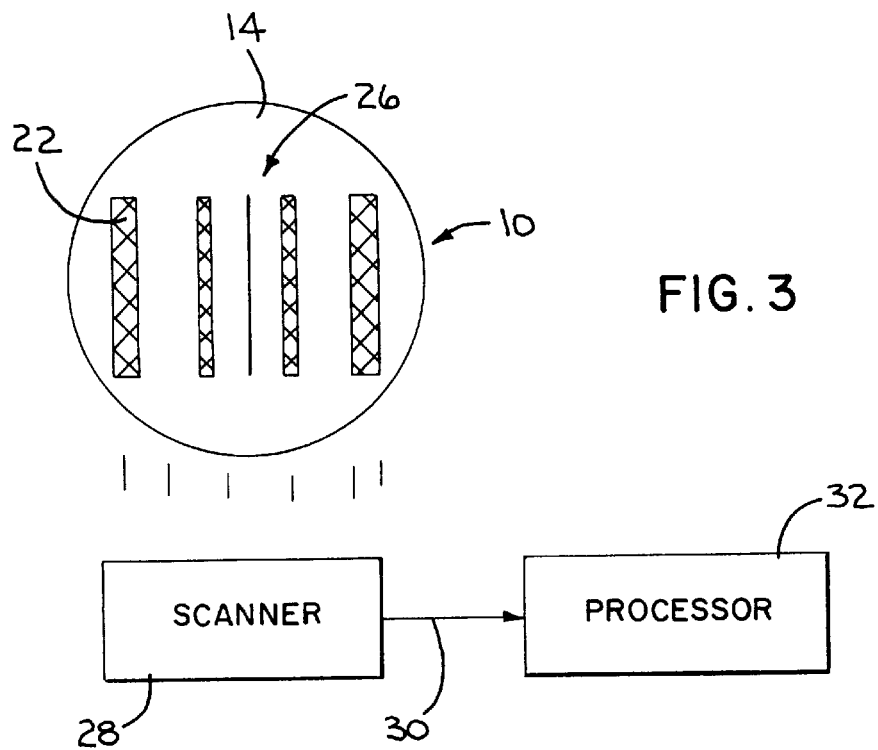
FIG. 3 is a bottom view of a container as in FIGS. 1 and 2 with a further modified form of the invention incorporated therein and in association with a scanning system shown in schematic form.

A further modification, according to the present invention, is shown on the container 10 in FIG. 3 wherein the bottom wall 14 has the coating 22 applied thereto in the form of a scannable pattern 26. A scanner 28 has means for sensing the pattern 26 with the coating 22 in the first state. As an incident of sensing the presence of the coating 22 in the first state, a signal 30 is generated by the scanner 28 and received by a processor 32. The processor 32 may take a wide variety of forms and may produce useable data, such as recording which of a plurality of networked dispensing stations is refilling containers, and what quantity is being refilled throughout an entire establishment.

The scanner 28 and associated sensing structure can be constructed to not detect the pattern 26 in the second state or, alternatively, could produce a second signal upon sensing the coating 22 in the second state usable for another purpose.

Figure 4:
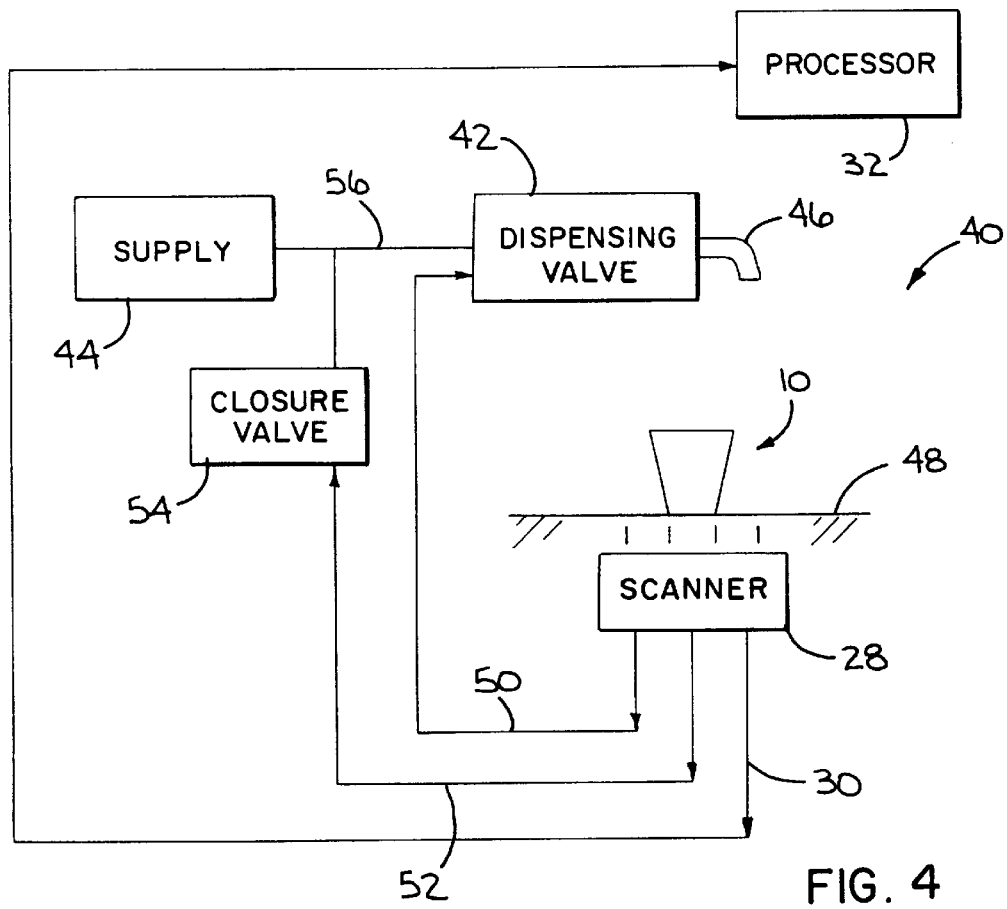
FIG. 4 is a schematic representation of a beverage dispensing system including a product container, according to the present invention, situated to receive dispensed product.

The inventive container 10 can be incorporated into a dispensing system as shown at 40 in FIG. 4. The dispensing system 40 includes a dispensing valve 42 that is selectively placed in an open state, wherein a beverage is allowed to flow from a supply 44 to a discharge conduit 46 into the container 10. The container 10 is supported on a surface 48 through which a pattern 26, as shown in FIG. 3, can be detected by the scanner 28. A scanning signal 30 resulting from sensing the presence of the coating in the first state can be sent to the processor 32 as previously described.

Additionally, or alternatively, the scanner 28 can, upon sensing the pattern 26 with the coating 22 in the first state, produce a signal 50 relayed to the dispensing valve 42, causing the valve 42 to change from an open state to a closed state, as a result of which discharge of beverage from the supply 44 is prohibited. Alternatively, a signal indicative of sensing the pattern 26 with the coating 22 in the first state is relayed to a closure valve 54 which blocks a feed line 56 communicating from the supply 44 to the dispensing valve 42.

With this arrangement, unauthorized refilling of the containers 10 can be prohibited. At the same time, attempted refilling of containers can be made known to the establishment by identifying and/or recording the same through the processor 32.

Figure 5:
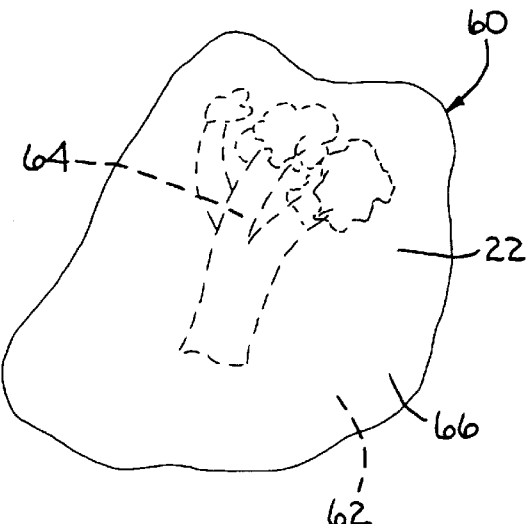
FIG. 5 is a plan view of a modified form of container, according to the present invention, with a product therein and with the container in a first state.
Figure 6:
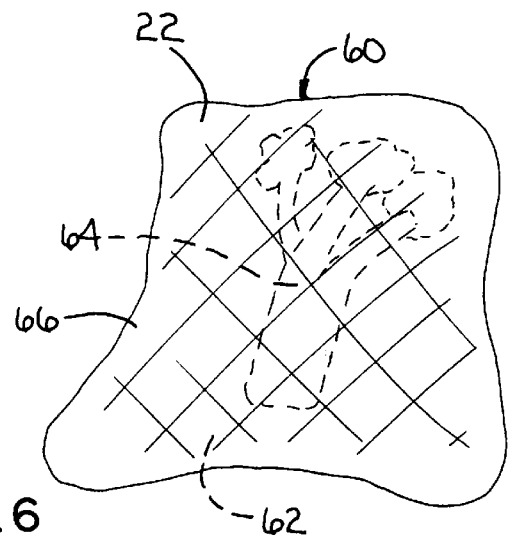
FIG. 6 is a view as in FIG. 5 with the product container in a second state.

In FIGS. 5 and 6, a modified form of the invention is shown. More particularly, a product container 60 is shown which is a bag-like element defining a receptacle 62 for a product, in this case a vegetable 64. It should be understood that while edible products are shown, the invention can be utilized in other types of containers for products that are temperature sensitive.

In this case, the coating 22 is applied to the external surface 66 of the container 60. Again, the coating 22 could be applied over the entire surface 66, or a part thereof, or controllably applied in a predetermined fashion, as to produce a message or design.

With this arrangement, the coating will change from the first state, shown in FIG. 5, to the second state, shown in FIG. 6, to give the user a visual indication that the temperature has dropped below a predetermined level, which could jeopardize the condition of the product.

According to the invention, product delivery and product temperature may be conveniently monitored. The coating 22 is such that it can be readily applied to any type of container, be it plastic, paper, wax coated, etc. Application can be facilitated by a silk screening process, as is well known to those skilled in the art.

The foregoing disclosure of specific embodiments is intended to be illustrative of the broad concepts comprehended by the invention.

I claim:

1. A product container comprising:

a continuous peripheral wall and a bottom wall cooperatively defining a cup-shaped receptacle for a supply of a beverage; and thermo chromic material on at least one of the continuous peripheral wall and bottom wall that has first and second visually discernible states, said thermo chromic material in the second state changing to the first state as an incident of the thermo chromic material being heated to above a first predetermined temperature, said thermo chromic material changing from the first state into the second state as an incident of a beverage being introduced to the cup-shaped receptacle at a temperature that is substantially below the first predetermined temperature to thereby cause the thermo chromic material to be cooled to below a second predetermined temperature that is substantially below the first predetermined temperature, said thermo chromic material changing from the first state into the second state as an incident of the thermo chromic material in the first state being cooled to below the second predetermined temperature, said thermo chromic material upon being cooled to change from the first state into the second state remaining in the second state until the thermo chromic material is heated from below the second predetermined temperature to above the first predetermined temperature, whereby the product container with the thermo chromic material initially in the first state can be used to visually ascertain a) the presence of a beverage served in the receptacle that is at a temperature below the second predetermined temperature that has caused the thermo chromic material to be cooled to below the second predetermined temperature and b) that a beverage served at a temperature below the second predetermined temperature was present in the receptacle and caused the thermo chromic material to be cooled to below the second predetermined temperature, by reason of the thermo chromic material being changed to the second state.

2. The product container according to claim 1 wherein the thermo chromic material in the first state has a first color and in the second state has a second color that is different than the first color.

3. The product container according to claim 1 wherein the second predetermined temperature is below 60° F.

4. The product container according to claim 1 wherein the one of the continuous peripheral wall and bottom wall has an exposed surface and the thermo chromic material comprises a coating applied to the exposed surface so that the thermo chromic material in the first state visibly contrasts with the exposed surface.

5. The product container according to claim 4 wherein the coating is at least one of a) applied to the entire exposed surface, b) applied to only a portion of the exposed surface and c) selectively applied to the exposed surface to produce a predetermined contrasting shape with the coating in the first state.

6. The product container according to claim 5 wherein the predetermined contrasting shape comprises one of a written message and a design.

7. The product container according to claim 1 wherein the product container has an exposed surface and the thermo chromic material comprises ink that is applied to the exposed surface using a silk screening process.

8. The product container according to claim 1 in combination with a product in the receptacle, said product being at least one of a) a liquid, b) a solid, and c) an edible article.

9. The product container according to claim 8 wherein the product in the receptacle comprises beer.

10. The product container according to claim 1 wherein the first predetermined temperature is in excess of 100° F.

* * * * *